(12) United States Patent
Bellwood et al.

(10) Patent No.: US 9,755,836 B2
(45) Date of Patent: Sep. 5, 2017

(54) IDENTIFYING AND LOCATING AUTHENTICATED SERVICES USING BROADCAST ENCRYPTION

(75) Inventors: Thomas A. Bellwood, Austin, TX (US); Jeffrey B. Lotspiech, Henderson, NV (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 12/950,115

(22) Filed: Nov. 19, 2010

(65) Prior Publication Data

US 2012/0131344 A1     May 24, 2012

(51) Int. Cl.
*H04L 9/32*         (2006.01)
*H04L 29/06*        (2006.01)

(52) U.S. Cl.
CPC .......... *H04L 9/3247* (2013.01); *H04L 63/126* (2013.01); *H04L 2209/601* (2013.01)

(58) Field of Classification Search
CPC ... H04L 2209/601; H04L 9/0816; H04L 9/32; H04W 12/04
See application file for complete search history.

(56) References Cited

U.S. PATENT DOCUMENTS

| | | | |
|---|---|---|---|
| 7,213,005 B2 | 5/2007 | Mourad et al. | |
| 7,277,870 B2 | 10/2007 | Mourad et al. | |
| 7,412,063 B2 | 8/2008 | Jung et al. | |
| 7,530,088 B2 | 5/2009 | Hamilton et al. | |
| 7,613,303 B2 | 11/2009 | Jung et al. | |
| 2003/0138100 A1* | 7/2003 | Ishizaka et al. | 380/201 |
| 2005/0086532 A1* | 4/2005 | Lotspiech et al. | 713/201 |
| 2006/0129490 A1* | 6/2006 | Collar et al. | 705/51 |
| 2006/0259199 A1* | 11/2006 | Gjerde et al. | 700/284 |
| 2007/0027812 A1* | 2/2007 | Ogawa et al. | 705/57 |
| 2009/0013179 A1 | 1/2009 | Jung et al. | |
| 2009/0016533 A1 | 1/2009 | Jung et al. | |
| 2009/0157551 A1* | 6/2009 | Bellwood et al. | 705/50 |
| 2010/0040231 A1 | 2/2010 | Jin et al. | |

* cited by examiner

*Primary Examiner* — Carl Colin
*Assistant Examiner* — Quy Pham
(74) *Attorney, Agent, or Firm* — John R. Pivnichny; Gregory K. Goshorn; Greg Goshorn, P.C.

(57) ABSTRACT

Provided are techniques to enable, using broadcast encryption, a device to locate a service offered by a server with the knowledge that the service offered by the server is a trusted service. A signed enhanced Management Key Block (eMKB) includes a trusted service locator (TSL) that includes one or more records, or "trusted service data records" (TSDRs), each identifying a particular service and a corresponding location of the service is generated and transmitted over a network. Devices authorized to access a particular service parse the eMKB for the end point of the service, connect to the appropriate server and transmit a request.

25 Claims, 7 Drawing Sheets

Figure 7

IDENTIFYING AND LOCATING AUTHENTICATED SERVICES USING BROADCAST ENCRYPTION

FIELD OF DISCLOSURE

The claimed subject matter relates generally to providing services over a network and, more specifically, to locating services using broadcast encryption.

SUMMARY

As computers and media devices have become connected via networks and the Internet, the amount of content transmitted among these devices has grown in proportion to the size of the communication channels, or the bandwidth. Once used primarily for electronic mail, or email, and small file transfers, networks such as networks in general and the Internet specifically are increasingly relied upon by providers to distribute high quality content such as movies and music recordings.

Content and service providers that distribute such high quality content face correspondingly increased production and/or licensing costs. Industries that seek to extend improved networked services to customers must assure that the collection and management of data remains in compliance with security policies and privacy requirements. To control security and restrict access to such material, content is sometimes protected by encryption, digital rights management (DRM) systems or conditional access (CA) systems.

A recent development in the field of encryption of digital data and communication is broadcast encryption. Broadcast encryption is based upon a Management Key Block (MKB), which is a block of cryptographic key data that can be used in conjunction with a set of Device Keys ($K_D$) on a receiving device (e.g. player, renderer etc.) to derive one or more Management Keys ($K_M$). These Management Keys can be used to (directly or indirectly) decrypt one or more content keys, which in turn can be used to decrypt content. Although for the purposes of the following examples, only a single title key is used, the claimed technology is also applicable to systems that employ multiple title keys. For example, some MKB configurations employ title key blocks in which different devices are potentially assigned to different security classes and derive a particular title key that corresponds to the assigned security class.

The term Content Key can be used to mean a simple Title Key ($K_T$), sets of Title Keys (for the same piece of content), Volume Keys, Sector Keys or Disk Keys and can be generalized to any granularity of key used to protect digital data. Large blocks of content may be divided into volumes, sectors or disks, each of which with a separate title key. For example, high definition video content may be divided into sectors that correspond to a progression of title keys that change either on a sector-by-sector basis or periodically during the course of a linear broadcast of the content. The MKB can be delivered concurrent with the content, for example at the beginning of a linear broadcast, or obtained "out-of-band" from a broadcast or internet service, messaged from other devices that are part of the same key space or placed on physical media in the case of prerecorded and recordable content. One of the largest advantages to broadcast encryption is that two or more devices, which might be previously unknown to each other, can agree upon a key over a one-way communication path. This advantage makes broadcast encryption ideal for the communication between two security system components. Another advantage is that broadcast encryption requires two or three orders of magnitude less overhead in the corresponding device than most other systems, thus lowering the cost of the devices for manufacturers and consumers.

Devices that implement the broadcast encryption mechanisms are said to "bind" the data and content they protect to a particular entity (e.g. storage media, a user, an account, a home network or cluster of one or more devices). The entity to which content is logically bound is represented by a domain unique binding identifier ($ID_B$) that is cryptographically combined with one or more management keys ($K_M$) to produce a different key, called the binding key ($K_B$). It should be noted that a $K_M$ used in conjunction with a $ID_B$ can be used as a basis of secure communication between devices in the same network, cluster or authorization table (AT), which is a list of authorized devices in a particular cluster. An example of how a $K_B$ is derived from a simple $K_M$, which is itself derived from a MKB, is explained below. Some current simple approaches to binding a piece of content to a particular entity, regardless of whether it is a piece of media, a device, or a user, is through one level of indirection in the calculation of is encrypted title key ($E_{KT}$) from the entity's binding key ($K_B$). In these cases, the procedure to encrypt a piece of content is roughly the following:

1. Extract a Management Key ($K_M$) by processing the MKB.
2. Perform a one-way function to a piece of data that uniquely identifies the entity this content is being bound to (or the "$ID_B$"), using Km and resulting in a binding key (i.e. $K_B = G(K_M, ID_B)$). In the case of cluster or network binding, $ID_B$ represents a unique network identifier.
3. Select a title key ($K_T$), which may be either random or predetermined, for this piece of content and encrypt it using $K_B$, resulting in an encrypted title key ($EK_T$) (i.e. $EK_T = E(K_B, K_T)$).
4. The content is encrypted with the $K_T$ and then the encrypted content is stored in conjunction with the $EK_T$.
5. If the MKB supports multiple security classes, repeat steps 1-4 for each Management Key at the desired security class to create a set of title keys. Implementations may choose to use the same set of title keys to protect a logical volume of content or all or portions of a disk of content.

Once the procedure has been implemented, any compliant device that has access to the same MKB, $ID_B$ and $EK_T$ can decrypt a communication or content by reproducing the same $K_B$ and decrypting $K_T$.

In a further development, the broadcast encryption system has been extended to enable groups, domains or "clusters," of devices to be collected into secure authorized logical networks. In a particular cluster, the list of authorized devices is represented in an entity called an authorization table (AT). If a device's authorization state is changed (e.g. a new device is authorized, a device is suspended or deleted from the cluster), the AT is updated to reflect the change. The Authorization Table, in such a scheme, would be a component of the Binding Key; therefore, when it is updated any data encrypted by the Binding Key (e.g. Title Keys) would in turn need to be re-encrypted. As devices change "clusters" or networks (e.g. from sale or purchases) the $ID_B$ may also change, again causing a need for the binding key to be updated and hence all data or content keys.

An addition development with respect to a broadcast encryption-based content protection scheme is, rather than a single $K_M$, multiple management keys, or management key variants ($K_{MV}$), e.g. $K_{MV}1$, $K_{MV}2$, and so on, are provided. Typically, a single device can only calculate a single $K_{MV}$. Management key variants are employed for forensic purposes in situations in which prepared content has been authored with different equivalent variations. Unlike the typical broadcast encryption-based content protection scheme in which device keys are used to directly derive a $K_M$, a device employs the device keys to derive a $K_{MV}$, which is then employed to derive a "base" $K_M$.

Another development is the introduction of management key precursors. Devices are assigned a security class and derive a management key precursor ($K_M(-i)$ or $K_M^{-1}$) from a $K_{MV}$. Devices of higher security classes are assigned higher "i" values. For example, a device with a security class of '3' would be of a higher security class than a device with a class of '1'. A "base," or the lowest, security class is a class of '0'. A device in a security class higher than the base class may calculate a $K_M(-i)$ for devices in a lesser security class, if necessary, all the way to the base class by iteratively executing the following one-way function: $K_M^{-(i-1)} = AES\_G(K_M^{-1}, kcd)$, where kcd is a keyspace specific constant. Another development is the implementation of recording keys, which are similar to management key variants, and are employed when content is recorded locally in a particular cluster.

Provided are techniques for generating an enhanced management key block (eMKB) including broadcast encryption management key block (MKB) data and information corresponding to a plurality of service providers, according to one of the described techniques, the eMKB is digitally signed with a verification signature to produce a digitally signed eMKB operable by a device to verify, using the verification signature, authenticity of each service provider of the plurality of service providers based upon a verification of the digitally-signed eMKB. Thereafter using the described technique the digitally signed eMKB is transmitted, including the verification signature, to the device.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for locating and contacting services in a secure manner using broadcast encryption. The term "programmed method", as used herein, is defined to mean one or more process operations that are presently performed; or, alternatively, one or more process operations that are enabled to be performed at a future point in time. The term 'programmed method" anticipates three alternative forms. First, a programmed method may comprise presently performed process operations. Second, a programmed method may comprise a computer-readable medium embodying computer instructions, which when executed by a computer performs one or more process operations. Finally, a programmed method may comprise a computer system that has been programmed by software, hardware, firmware, or any combination thereof, to perform one or more process operations. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Provided are techniques for the encryption and decryption of content such that multiple devices, configured as a cluster, can both locate trusted services and freely share the content within the cluster. A licensing authority (LA) creates a signed enhanced Management Key Block (eMKB) that includes, among other information, a trusted service locator (TSL), including one or more records, or "trusted service data records" (TSDRs), each identifying a particular service, typically by function, and a corresponding location of the service. Since the eMKB has been signed by the LA, this record is trusted, or pre-authenticated. In one embodiment, a TSL includes a type field to identify the type of service, a record length field to enable variable length records, a universal resource name (URN) to identify the service by name and a service endpoint in the form of a universal resource identifier (URI) or a universal resource locator (URL).

In one embodiment, the eMKB, rather than providing a list of trusted services, provides a reference to a trusted service, such as but not limited to a trusted service registry (TSR), from which a client may identify trusted services by function. In another embodiment, each record may include additional information such as a complete web service descriptor, which may include additional information on service transport protocol, message format and additional security policies, and multiple URI/URLs. In addition a record may include references to any additional certificates and public keys the LA deems necessary as well as additional data regarding each service, including, but not limited to, constraints, policies, rules and directives. Examples of constraints include service activation or expiration times, limits on devices of a certain classification or manufacturer, service availability information (e.g., 9 am to 5 pm EST) and geographical constraints. An example of a directive may be that a requestor must contact a particular service during initialization or upon physical connection to a type of network. Examples of policies or rules might include a requirement on data encryption (such as minimum key lengths) when a message is transferred over the service, that a message includes an indication that an owner has signed a license or that all message exchanges need to include some piece of host device information.

As the inventors herein have realized, devices not traditionally networked are becoming important data collection points as parts of intelligent industry networks, such as "smart" meters in energy and utility settings and health monitoring in healthcare. In addition, the Internet is being used to carry critical operational and personal data that is gathered for analysis and employed within automated processes. It should be understood that a "device" may be, but is not limited to, a virtual device, an application client and client services. Although the term "service" is primarily described below in the context of the delivery of media content, it should be understood that a service may also be, but is not limited to, delivery of a utility, such as electricity or telecommunication functionality, from a utility service provider or information that governs access to physical resources, such as from meters in a energy and utility infrastructure or from cell phones and mobile devices in a telecommunications company.

Figure 1:
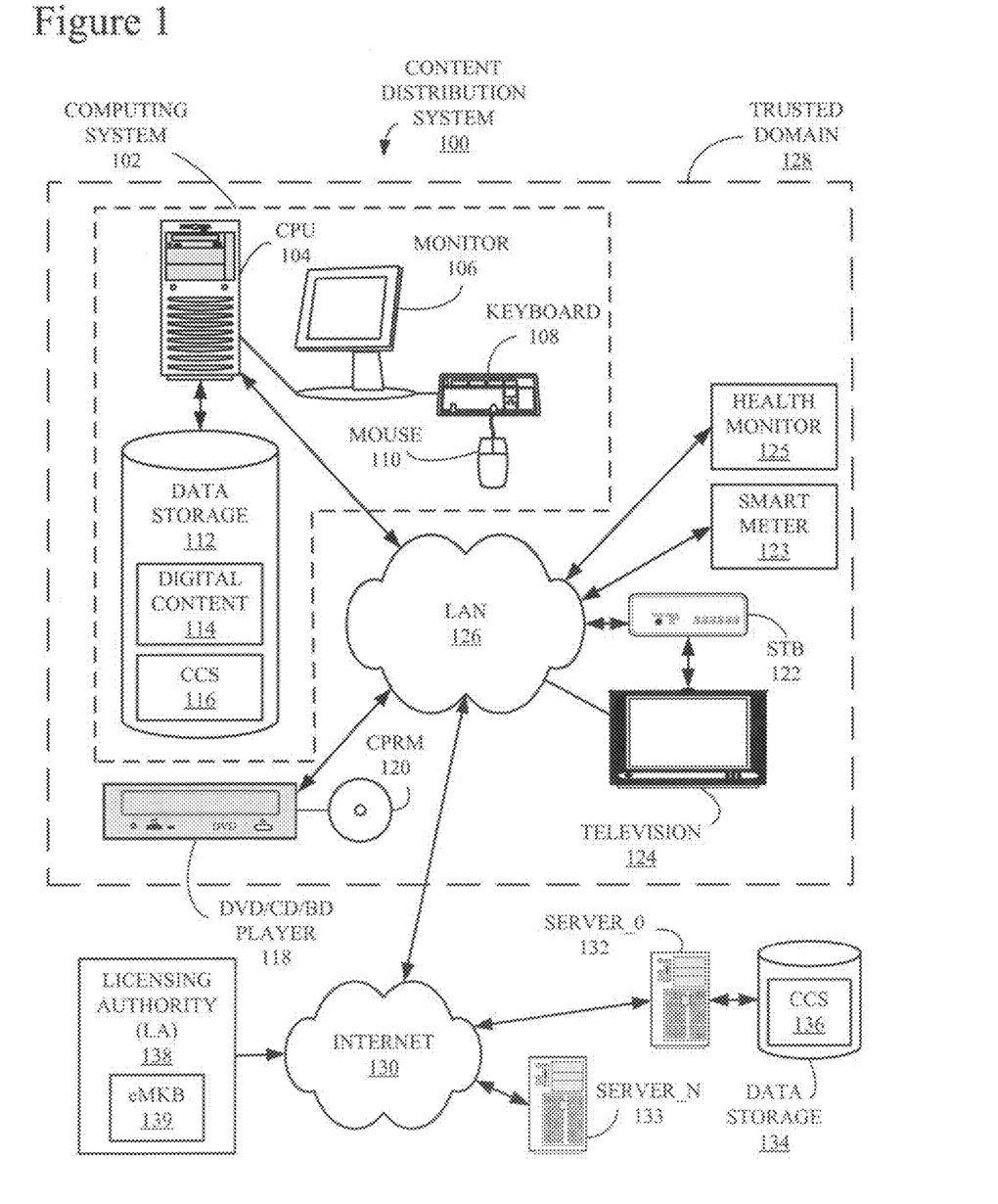
FIG. 1 is a block diagram of one example of a media delivery architecture that may implement the claimed subject matter.

Turning now to the figures, FIG. 1 is a block diagram of one example of a home digital data delivery architecture, including a content distribution system, 100 that may implement the claimed subject matter. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing digital content 114, which is described in more detail below in conjunction with FIGS. 3-7. It should be noted that although digital content 114 is described as digital data, there is no requirement that content protected by the claimed subject matter be digital in nature. The claimed subject matter is equally applicable to analog content. Digital content 114 is used merely as an example for the purposes of illustration. Stored on data storage is a content control system (CCS) 116 that is one example of an implementation of the claimed subject matter. CCS 116 is described in more detail below in conjunction with FIGS. 2-7. It should be noted that CCS 116 is shown installed on client system 102 for the purpose of the following description but could also be installed on any data and/or media delivery device, such as, but not limited to, a digital video device/compact disk/BluRay disk (DVD/CD/BD) player 118, set-top box (STB) 122, a smart meter 123, a television 124 and a home health monitor 125. It should be noted that although some devices, such as but not limited to smart meters and an electrical company, deliver data and/or service using different infrastructures for IP data transmission, these providers, although not currently associated with broadcast encryption techniques, may be part of the same type of authenticated home network disclosed in conjunction with the claimed subject matter. CCS 116 may also be stored by network accessible (or attached) storage devices, i.e. stored in a remote Internet account but accessible by the network. CCS 116 may also be comprised of many different storage devices and locations but made to appear as one logical system via file system software (e.g. network file system or grid file system).

Computing system 102 is part of an authorized, or trusted, domain 128 of devices. In general, an authorized or trusted domain is a group of devices that adhere to the standards of the claimed subject matter and are able to freely share digital content that is authorized for use by any one of them and in which the authorization has not been revoked. Trusted domain 128, in this example, may also include DVD/CD/BD player 118, STB 122, television 124 and flash memory (not shown). Devices 102, 118 and 122-125 are used merely as examples of types of devices that might be included in an authorized or trusted domain such as domain 128. Those with skill in the relevant arts will appreciate that are many types of devices, such as, but not limited to, a digital video recorder (DVR), personal computer (PC), book reader, portable drives, mobile phones, and so on, that would benefit form the ability to freely share digital content that is otherwise protected from devices outside of a trusted domain.

Devices 102, 118, 122 and 124 of trusted domain 128 are communicatively coupled via a local area network (LAN) 126. Of course, there are many options for coupling such devices including direct connections, wireless connections and even over multiple interconnected LANs (not shown), a metro area network (MAN) or a wide area network (WAN). In addition, there could be devices (not shown) coupled to LAN 126 or any of devices 102, 118, 122 or 124 that are not included in trusted domain 128. A disk 120 implementing, in this example, Content Protection for Recordable Media (CPRM) is rendered and may be produced by DVD/CD/BD player 118. CPRM is also applicable to streamed media content. It should be noted that CPRM disk 120 is used merely as an example of one of multiple possible content protection schemes. One other example is the Advanced Access Content System (AACS) developed by a consortium including IBM and other companies. In addition to CPRM, other examples of content protection schemes include Secure Digital (SD) cards (not shown) and Content Protection for Extended Media (CPXM). Disk 120 may include information for implementing the claimed subject matter.

LAN 126 is coupled to the Internet 130, which is communicatively coupled to a server_0 132 and a server_N 133. In the following description, server_0 132 is used as an example of a source of downloaded digital content and server_N 133 is an example of a utility service provider. Both servers 132 and 133 employ the claimed techniques to be located by a device, ensure that the device is authorized to receive the respective content or service and implement the delivery. Although not shown, servers 132 and 133 typically include a CPU, or processor, keyboard, mouse and monitor to enable human interaction. Although in this example, computing system 102 and servers 132 and 133 are communicatively coupled via LAN 126 and the Internet 130, in alternative embodiments they may be coupled through any number of communication mediums such as, but not limited to, a direct wire or wireless connection. Further, servers 132 and 133 could be linked directly to LAN 126 and could be either included in trusted domain 128 or not. In this example, servers 132 and 133 are not part of trusted domain 128. Server 132 is coupled to a data storage device 134, which, like data storage 112, may either be incorporated into server 132 i.e. an internal device, or attached externally to server 132 by means of various, commonly available connection devices such as but not limited to, a universal serial bus (USB) port (not shown). Data storage device 134 is illustrated storing a CCS 136, which is described in more detail below in conjunction with FIGS. 2-8. Typically, server_N 133 would also include data storage, which for the sake of simplicity is not shown.

Also coupled to Internet 130 is a licensing authority (LA) 138, which as explained in detail below, includes a key generation service (not shown) that generates enhanced management key blocks (eMKB), one of which, an eMKB 139, is illustrated. Like a typical MKB, eMKB 139 is associated with a key space and may be delivered to a client in conjunction with associated encrypted content. MKBs, including eMKB 139, represent a universal set of keys needed for all appropriately-configured devices and classes of devices. For example, North American Cable may have an eMKB that provides for all devices that can participate in their shared network, such as Cox, Time Warner and Comcast, including STBs, cell phones, health care monitors, any approved retail media player or recorder device, PC software players of video and so on. It should be understood that the term "MKB" is used to refer to both current eMKBs, implemented in accordance with the claimed subject matter, and current MKBs. If digital content 114 was originally delivered on an optical disk, an MKB may also be delivered via the same optical disk. LA 138, CCSs 116 and 136 and MKBs such as eMKB 139 are employed to implement aspects of the claimed subject matter and are described in more detail below in conjunction with FIGS. 2-8.

Figure 2:
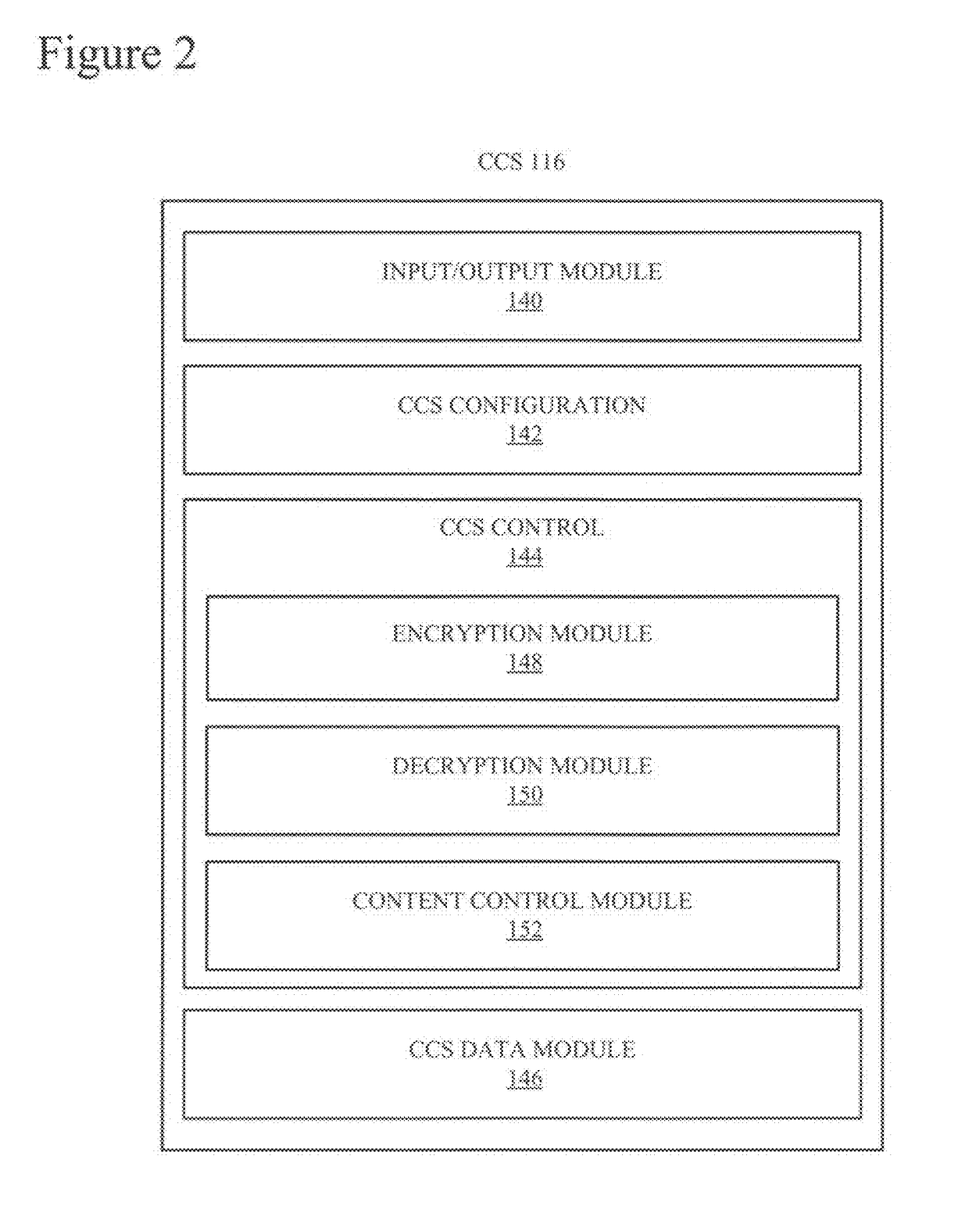
FIG. 2 is a block diagram of a content control system (CCS), first introduced in FIG. 1, in more detail.

FIG. 2 is a block diagram of a CCS such as CCSs 116 and 138, first introduced in conjunction with FIG. 1, in more detail. For the sake of convenience, a CCS is described with respect to CCS 116. In this example, CCS 116 is stored on data storage 112 (FIG. 1) and executed on CPU, or processor, 104 (FIG. 1) of computing system 102 (FIG. 1). A similar device, i.e. CCS 138, is illustrated on server 132 (FIG. 1). Of course, CCS 116 could also be stored and executed on another computing system (not shown) or any media or content delivery device such as, but not limited to, DVD/CD/BD player 118 (FIG. 1), STB 122 (FIG. 1) and server_N 133 (FIG. 1). In fact, the disclosed techniques may be implemented on any device that is configured to control access to content or data. CCS 116 includes an input/output (I/O) module 140, a CCS Configuration module 142, a CCS Control module 144 and a CCS data cache component 146. It should be understood that the representation of CCS 116 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication CCS 116 has with other components of computing system 102 and system 100. CCS configuration module 142 stores parameters defined by an administrator to control the setup and operation of CCS 116. Examples of such configuration parameters include, but are not limited to, security settings, display options and so on. In addition, parameters may be defined that list potential users, applications and computing hosts and corresponding levels of security and specific implementations of the claimed technology.

CCS control module 144 includes logic to control the operation of CCS 116 in conformity with parameters stored in CCS configuration module 142. CCS control module 144 includes an encryption module 148, a decryption module 150 and a content control module (CCM) 152, all of which are explained in more detail below in conjunction with FIGS. 5-7. CCS data module 146 is a data repository or cache for information, including settings and other information that CCS 116 requires during operation. Examples of the types of information stored in CCS data module 146 include, but are not limited to, specific commands employed in conjunction with modules 148 and 150. In addition, CCS data module 146 may store intermediate results associated with the processing of CCS 116. Processing associated with elements 116, 140, 142, 144, 146, 148, 150 and 152 are described in more detail below in conjunction with FIGS. 5-7.

Figure 3:
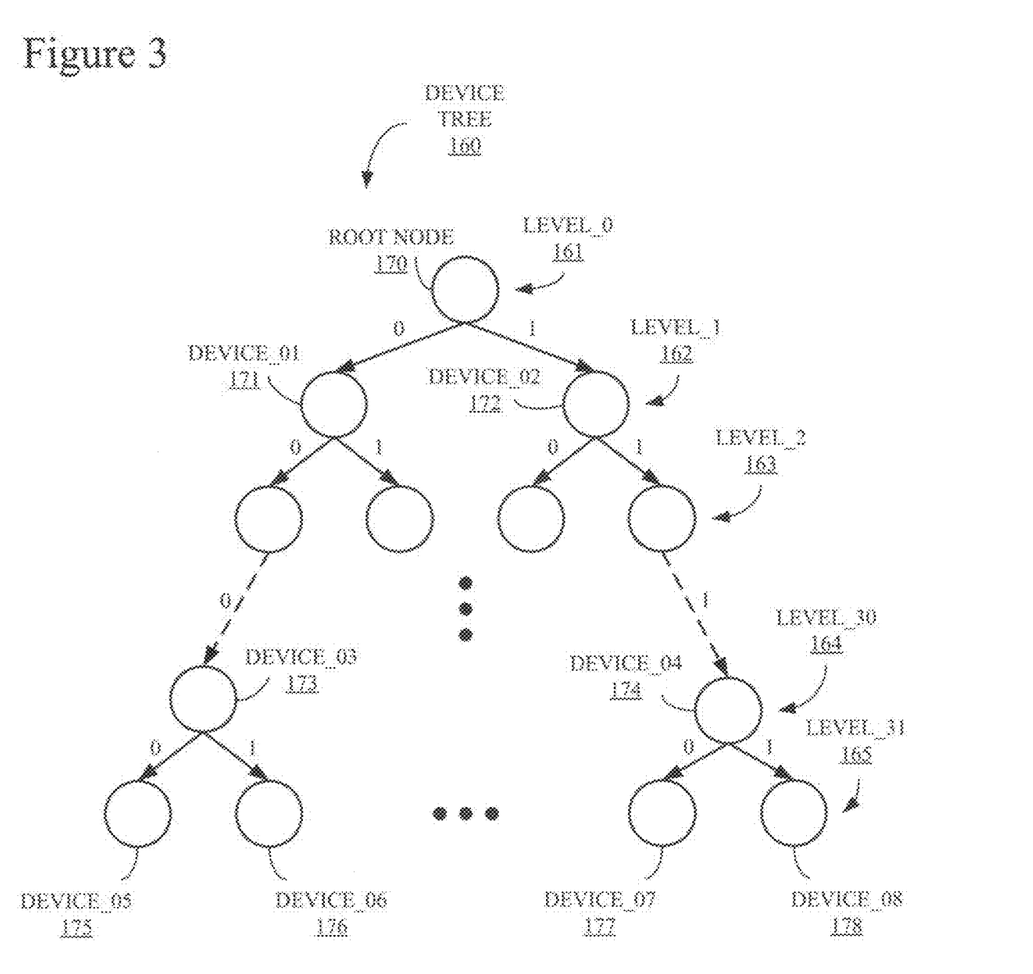
FIG. 3 is a block diagram of a hierarchical device tree employed in one embodiment of the claimed subject matter.

FIG. 3 is a block diagram of an example of a hierarchical structure that may implement the claimed subject matter, specifically a binary device tree 160 employed in one embodiment of the claimed subject matter and employed as an example throughout the present description to explain aspects of the claimed subject matter. It should be understood that the claimed subject matter is also applicable to other types of hierarchical structures such as, but not limited to, a tree that splits into a number "N" branches at each level. In this example, device tree 160 is organized into thirty-two (32) levels, i.e. a level_0 161, a level_1 162, a level_2 163 and so on up to a level_30 164 and a level_31 165, although fewer or more levels can be represented in an MKB or eMKB depending upon the size of the desired keyspace. For the sake of simplicity, intervening levels are not illustrated. Level_0 161 has one (1) device, or node, i.e. a root node 170, and each level 161-166 has the potential of twice as many devices, or nodes, as the immediately preceding level. For example, level_0 161 represents one (1 or $2^0$) device, level_1 162 has two (2 or $2^1$) nodes, level_2 163 has four (4 or $2^2$) and so on up to level_30 164, which potentially has $2^{30}$ listed devices, and level_31 165, which potentially has $2^{31}$ listed devices. At each level, devices or nodes are represented as circles but, for the sake of simplicity, each device is not necessarily labeled.

Two examples of devices at level_1 162, i.e. a device_01 171 and a device_02 172, and two examples of devices at level_30 164, i.e. a device_03 173 and a device_04 174, are labeled. Several examples of devices at level_31 165 are labeled, i.e. a device_05 175, a device_06 176, a device_07 177 and a device_08 178. Each device in tree 160, such as devices 171-178, whether labeled or not has a unique device number that represents a pre-order traversal of device tree 160. Each connection between nodes at the adjacent levels is labeled either '0' for a left traversal of tree 160 or '1' for a right traversal. In this manner, device_05 175 has a device number of "0000 0000 0000 0000 0000 0000 0000 0000," device_06 176 has a device number of "0000 0000 0000 0000 0000 0000 0000 0001," device_07 177 has a device number of "1111 1111 1111 1111 1111 1111 1111 1110" and device_08 178 has a device number of "1111 1111 1111 1111 1111 1111 1111 1111." Device tree 160, levels 161-165, root node 170, devices 171-178 and devices numbers are used as examples during the reminder of the present description to explain the claimed subject matter.

Figure 4:
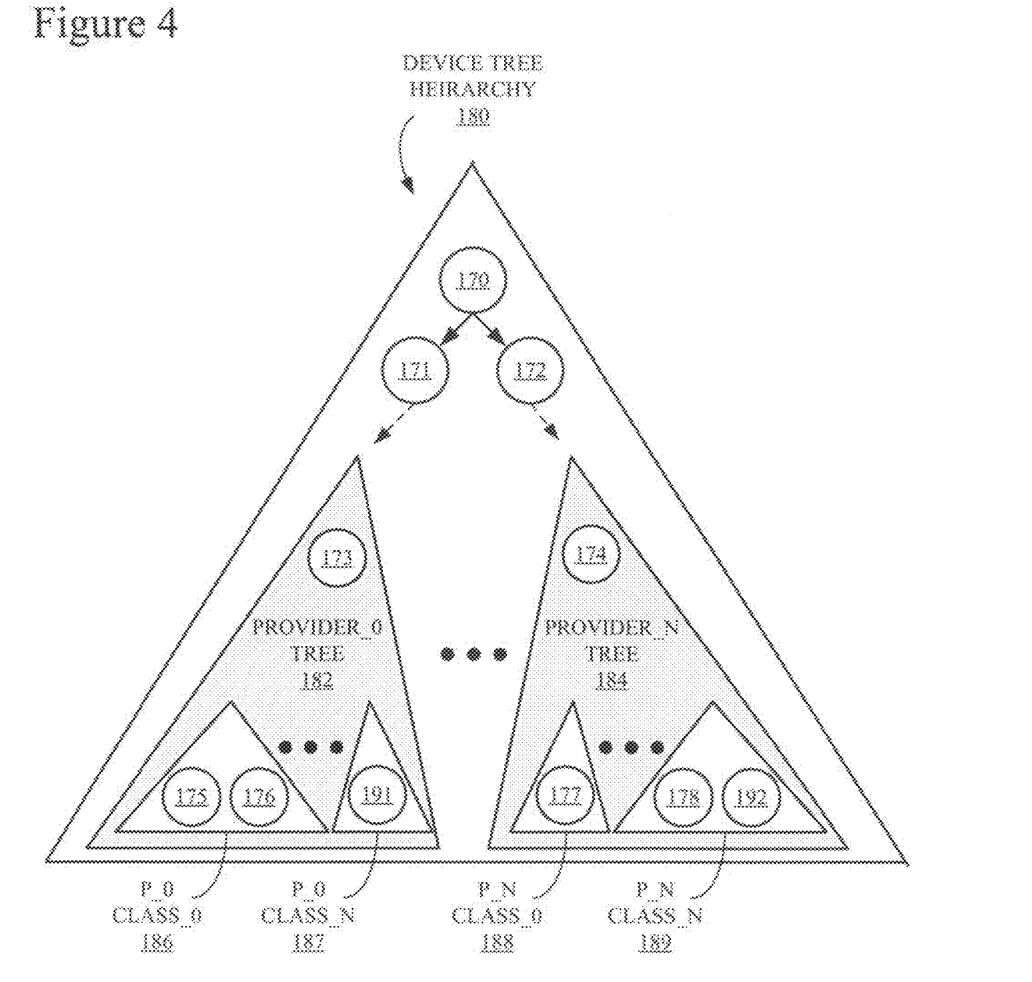
FIG. 4 is a block diagram of a hierarchical structure associated with the device tree of FIG. 3.

FIG. 4 is a block diagram of a hierarchical structure 180 associated with device tree 160 of FIG. 3. For the sake of simplicity, only nodes 170-178 from tree 160 are shown. In this example, device tree hierarchy 180 organizes device tree 160 into provider sub trees, or which two, i.e. a provider_0 tree 182 and a provider_N tree 184 are shown. In the following examples, provider trees 182 and 184 are associated with two different content or service providers, for server_0 132 (FIG. 1) and server_N 133 (FIG. 1) respectively. In this example, provider_0 tree 182 corresponds to a service provided by server_0 132 (FIG. 1) and is represented by device_01 171 (FIG. 3). Provider_N tree 184 corresponds to a service provided by server_N 133 (FIG. 1) and is represented by device_02 172 (FIG. 3).

Provider_0 tree 182 corresponds to level_1 162 (FIG. 3) and attached nodes or lower levels. Therefore, provider_0 tree 182 includes device_05 175 and device_06 176, which are organized as a provider_0 class_0 (P_0 C_0) 186. Provider_0 tree 182 also includes a P_0 C_N 187 and an associated device 191. Different classes such as classes 186 and 187 may be employed to represent devices with, but not limited to, different permissions, different levels of service and different device manufactures. The disclosed subject matter enables multiple service providers, using a single LA 138 (FIG. 1) and a single eMKB 139 (FIG. 1) to control all associated devices.

Provider_N tree 184 is illustrated as including device_07 177, which is organized into a P_1 C_0 188, and device_08 178 and a device 192, which are organized into a P_N C_N 189. For the sake of convenience only, a few devices, sub-trees and distinct providers are illustrated but one with skill in the art will appreciate that the disclosed techniques are scalable to many providers and applicable to many, possibly interrelated organizational structures.

Figure 5:
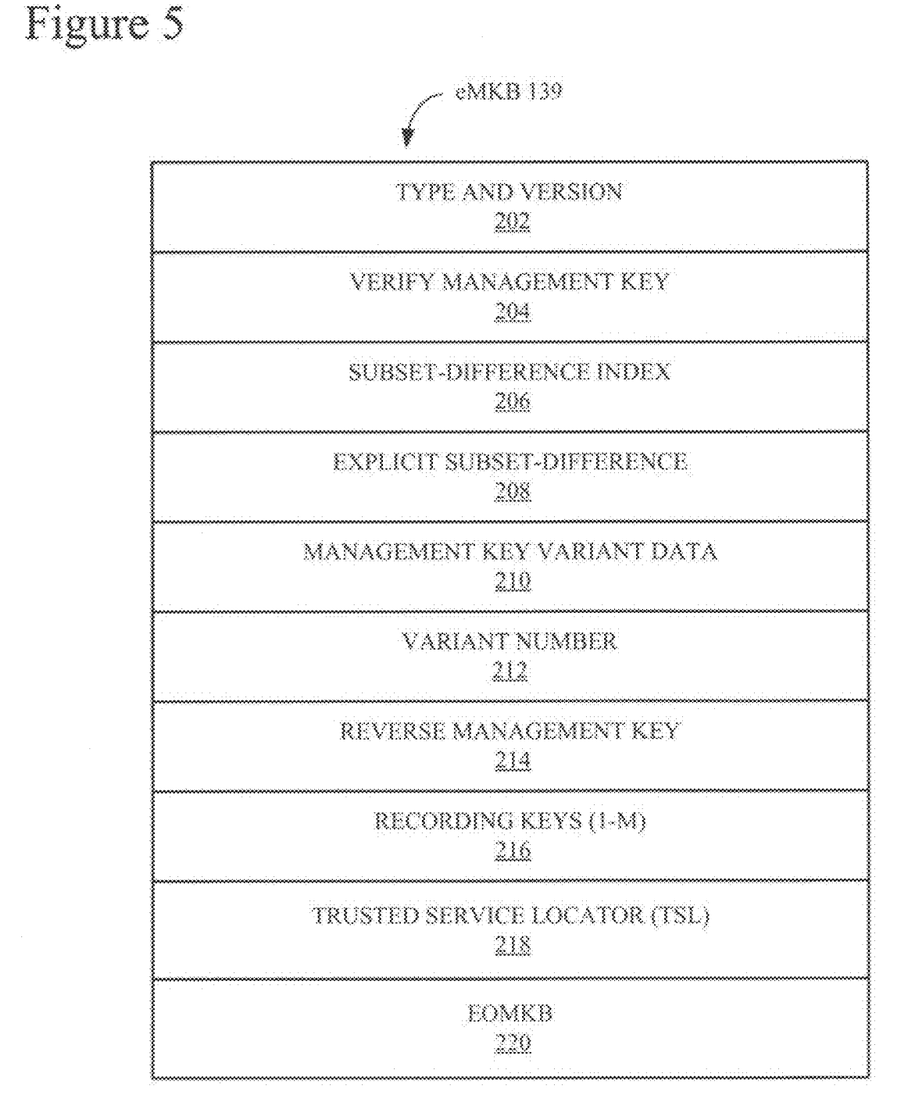
FIG. 5 is a block diagram of an enhanced management key block (eMKB), first introduced in FIG. 1, in more detail.

FIG. 5 is a block diagram of eMKB 139, first introduced in FIG. 1, in more detail. eMKB 139 is an example of a MKB that has been modified to implement the claimed subject matter. As explained above in conjunction with FIG. 1, eMKB 139 is generated by LA 138 (FIG. 1) and may be transmitted in conjunction with encrypted content, such as digital content 114 (FIG. 1), to a device (in this example computing system 102 (FIG. 1)). In this example, CCS 116 (FIG. 1) employs eMKB 139 to decrypt digital content 114 for rendering by computing system 102.

eMKB 139 includes a type and version block 202, a verify management key block 204, a subset-difference index 206, an explicit subset-difference block 208, a management key variant data block 210, a variant number block 212, a reverse management key block 214, recording keys (1-M) block 216, a trusted source block, or "trusted service locator" (TSL) 218 and an end of management key block (EOMKB) 220. Type and version block 202 is employed by a content control system of a device, in this example, CCS 116 (FIG. 1) of computing system 102 (FIG. 1), to determine the proper manner to process a corresponding MKB, such as eMKB 139, and whether or not a received MKB is more recent than any MKB currently stored on device 102. A version number is stored in block 202. LA 138 (FIG. 1) increments the version number and inserts the updated number into subsequent MKBs each time a change necessitates an update. Examples of such a change include, but are not limited to, an addition to or deletion from authorized or prohibited device lists.

Verify management key 204 is employed by CCS 116 to process eMKB 139 and calculate a management key ($K_M$). Management keys are described in more detail below in conjunction with FIGS. 5-7. Subset-difference index 206 stores an index that enables a particular device to more efficiently lookup the device's corresponding record in explicit subset-difference block 208. Explicit subset-difference block 208 stores a number of records, each record containing a U mask ($m_u$) (not shown) and a UV number (not shown). A V mask ($m_v$) and a path number are derived from the UV number. Like the $m_u$, the $m_v$ is applied against the path number to identify a node in eMKB 139 and the identified node represents a subset of nodes, i.e. the specific node and all the connected nodes below. Together, the $m_u$ and $m_v$ identify a "subset-difference," i.e. a sub-tree of nodes of device tree 160 (FIG. 3) rooted at the node identified by $m_u$ minus the sub-tree of nodes rooted at the node identified by $m_v$. Blocks 206 and 208 and the subset are explained in more detail below in conjunction with FIGS. 5-7.

Management key variant data 210 stores management key variant data for subset-differences identified in explicit subset-difference record 208. Variant number block 212 stores the associated encrypted variant number data for the subset-differences identified in explicit subset-difference record 208. Reverse management key block 214 stores information to enable CCS 116 to decrypt a $K_M$ from a management key variant stored in block 210. In one embodiment of the claimed subject matter, a reverse management key enables CCS 116 to calculate a management key precursor instead of a management key. A management key is then calculated from the management key precursor. Recording keys (1-M) block 216 stores encrypted recording keys. Management key variants, variant numbers, reverse management keys and recording keys are described in more detail below in conjunction with FIGS. 5-7.

TSL 218 stores records related to authorized, or "trusted," services that a particular device may access. In an alternative embodiment, rather than listing individual services, a location of a list or registry of trusted services is provided. TSL 218 is explained in more detail below in conjunction with FIG. 6. Finally, EOMKB 220 indicates the end of eMKB 139.

Figure 6:
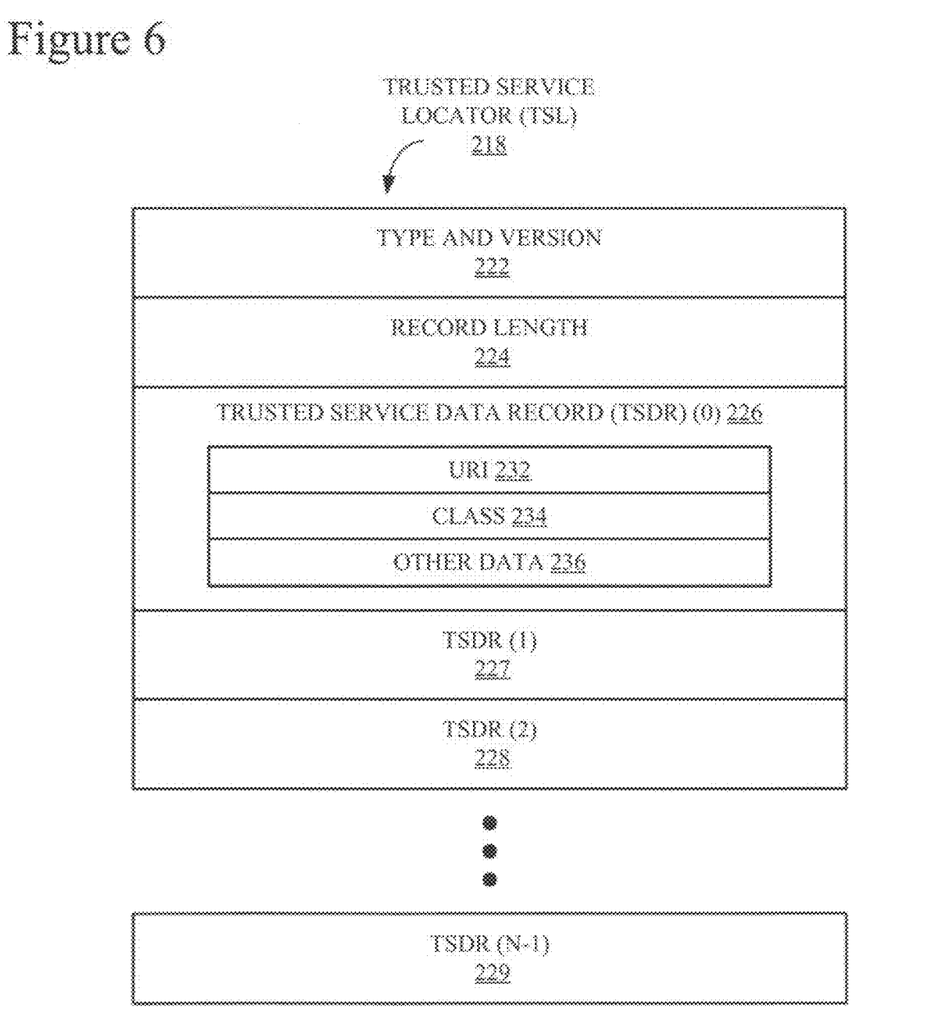
FIG. 6 is a block diagram of a Trusted Service Locator, first introduced in FIG. 5, in more detail.

FIG. 6 is a block diagram of TSL 218, first introduced in FIG. 5, in more detail. Like eMKB 139 (FIGS. 1 and 5) of which TSL 218 is a part, TSL 218 is generated by LA 138 (FIG. 1) and transmitted in conjunction with encrypted content, such as digital content 114 (FIG. 1) to a device, in this example computing system 102 (FIG. 1). CCS 116 (FIG. 1) employs TSL 218 to locate services authorized to conduct transactions with associated devices. Although TSL 218 may be self-verifying by virtue of features incorporated into eMKB 139 (see verify management key 204, FIG. 5), TSL may also include data to enable a device to verify either TSL 218 or individual trusted service data records (TSDRs) such as TSDs 226-229.

TSL 218 includes a type and version block 222, which is employed by a content control system of a device, in this example CCS 116 (FIG. 1) of computing system 102 (FIG. 1), to determine the proper manner to process a corresponding TSL, such as TSL 218. Record length 224 stores the overall length of the corresponding TSL thus enabling variable length TSL records. TSL 218 also comprises a number of TSDRs (0 through N−1) 226, 227, 228 and 229. For the sake of convenience, only four (4) such records are illustrated and only trusted service data (0) 226 is shown in any detail.

Each of TSDR 226-229 comprises a universal resource identifier (URI) 232, a class 234 and an Other Data (OD) block 236. URI 232 includes a universal resource name (URN) (not shown), which identifies the service type, including such information as a transmission protocol, of a corresponding service, and a universal resource locator (URL) (not shown), which specifies a service endpoint of the corresponding service, as specified by LA 138. URIs, URNs and URLs should be familiar to those with skill in the computing arts. In addition, it should be understood that URIs, URNs and URLs are only one example of many possible techniques to identify and locate services. In the alternative, TSDRs 226-229 may be replaced with a pointer to a registry or some other listing and descriptions of available, trusted services.

Class block 234 identifies a security class associated with the corresponding service. OD block 236 stores additional information about the corresponding service, including but not limited to, a display name, a description, reference links, web services data, service provider specific data and constraints, directives and policies that may apply to the service. OD block 236 may also include such information as an expiration and/or renewal date(s) for corresponding services and the type of server that provides a particular service.

Figure 7:
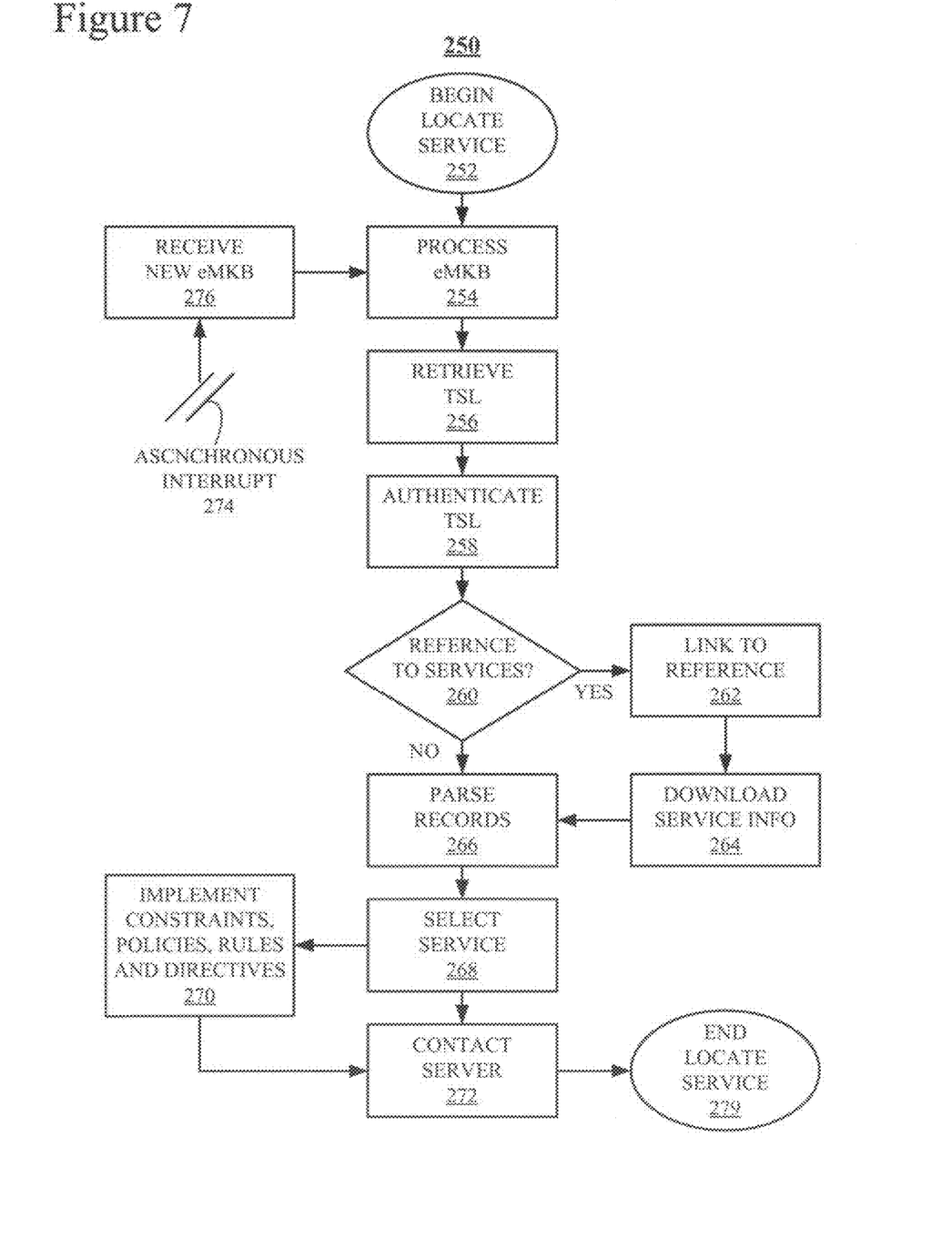
FIG. 7 is a flow chart illustrating one example of a Locate Service process according to the claimed subject matter.

FIG. 7 is a flow chart illustrating one example of a Locate Service process 250 in accordance with the claimed subject matter. In this example, logic associated with process 250 is stored on data storage 112 (FIG. 1) as part of CCS 116 (FIG. 1) and executed on processor 104. Process 250, which is typically called by CCS 116 when a particular service is needed or requested by a device such as devices 122 and 118 (FIG. 1), starts in a "Begin Locate Service" block 252 and proceeds immediately to a "Process enhanced management key block (eMKB)" block 254.

During a process portion depicted by block 254, process 250 retrieves a stored eMKB such as eMKB 139 (FIG. 1). As explained above in conjunction with FIG. 1, eMKB 139 is generated by LA 138 and broadcast to devices such as computing system 102, which then store eMKB 139 in local storage until needed. During a "Retrieve trusted service locator (TSL)" block 256, TSL 218 (FIGS. 5 and 6) is retrieved from eMKB 139, which was retrieved during block 254. During an "Authenticate TSL" block 258, process 250 verifies that TSL 218 has not been altered. Typically, this is accomplished using standard cryptographic methods in conjunction with Verify Management key 204 (FIG. 5) of eMKB 139. In one alternative embodiment, TSL 218 may include a verify management key. In another embodiment, each TSDR 226-229 (FIG. 6) of TSL 218 may include a verify management key or its own. Further, a particular validating service may be proscribed by one of the TSDRs 226-229 of TSBL 218 with a directive to validate under certain conditions. Implicit in a verification of eMKB 139, TSL 218 or individual TSDRs 226-229 is that the identified services are verified, or "trusted."

During a "References to Services?" block 260, process 250 determines whether or not TSL 218 includes individual records corresponding to services, or TSDRs, or, as explained above in conjunction with an alternative embodiment, one or more references to a location of a list or registry of trusted services. If process 250, determines that TSL 218 references a list or registry rather than TSDRs corresponding to specific services, control proceeds to a "Link to Reference" block 262 during which the illustrated process establishes a connection to the identified list or registry. During a "Download Service Information (Info)" block 264, process 250 downloads service information from the identified list or registry.

Once records corresponding to available service have been downloaded during block 264, or, if during block 260 process 250 determined that TSL 218 included TSDRs, control proceeds to a "Parse records" block 266. During block 266, process 250 analyzes the records stored in TSL 218 or downloaded during block 264 for a match to the requested service. During a "Select Service" block 268, process 250 selects the appropriate service.

During an "Implement Policies, Directives and Constraints" block 270, process 250 implements policies, directives and constraints associated with the service selected during block 268. Examples of policies, directives and constraints are explained above and are typically stored in other data block 236 (FIG. 6) of the corresponding TSDR of eMKB 139. During a "Contact Server" block 272, process 250 establishes a connection with a server associated with the service selected during block 268.

An asynchronous interrupt 274 is generated when LA 138 transmits an updated eMKB 139. In this case, process 250 proceeds to a "Receive New eMKB" block 276 during which the updated eMKB 139 is received and stored. Process 250 then returns to Process eMKB block 254 and proceeds as explained above to ensure that a device is still authorized to access any particular service and all updated policies, directives and constraints are enforced. In other words, when an updated eMKB 139 is received, connections to services are subjected to verification and authorization. Finally, control proceeds to an "End Locate Service" block 279 in which process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    generating an enhanced management key block (eMKB) comprising a broadcast encryption management key block (MKB) data and information corresponding to a plurality of service providers;
    digitally signing the eMKB with a verification signature to produce a digitally signed eMKB operable by a device to verify, using the verification signature, authenticity of each service provider of the plurality of service providers based upon a verification of the digitally-signed eMKB; and
    transmitting the digitally signed eMKB, including the verification signature, to the device.

2. The method of claim 1, wherein the information corresponding to the plurality of service providers identifies an access location corresponding to a service of a plurality of services.

3. The method of claim 1, wherein a service associated with a service provider of the plurality of service providers is delivery of media content.

4. The method of claim 1, wherein a service associated with a service provider of the plurality of service providers is the collection of data provided by the device.

5. The method of claim 4, wherein the collected data is health monitoring information compiled by the device.

6. The method of claim 4, wherein the collected data is utility usage data compiled by the device.

7. A method, comprising:
    receiving, at a device, an enhanced management key block (eMKB) including broadcast encryption management key block (MKB) data and information corresponding to a plurality of service providers;
    verifying the eMKB with a verification signature associated with the eMKB; and
    verifying the authenticity of each service provider of the plurality of service providers based upon the verifying of the eMKB.

8. The method of claim 7, wherein the information corresponding to the plurality of service providers identifies an access location corresponding to a service of a plurality of services.

9. The method of claim 7, wherein a service associated with a service provider of the plurality of service providers is delivery of media content.

10. The method of claim 7, wherein a service associated with a service provider of the plurality of service providers is the collection of data provided by the device.

11. The method of claim 10, wherein the collected data is health monitoring information compiled by the device.

12. The method of claim 10, wherein the collected data is utility usage data compiled by the device.

13. An apparatus, comprising:
a processor;
a non-transitory computer-readable storage medium coupled to the processor; and
logic, stored on the computer-readable storage medium and executed on the processor, for:
generating an enhanced management key block (eMKB) comprising a broadcast encryption management key block (MKB) data and information corresponding to a plurality of service providers;
digitally signing the eMKB with a verification signature to produce a digitally signed eMKB operable by a device to verify, using the verification signature, authenticity of each service provider of the plurality of service providers based upon a verification of the digitally-signed eMKB; and
transmitting the digitally signed eMKB, including the verification signature, to the device.

14. The apparatus of claim 13, wherein the information corresponding to the plurality of service providers identifies an access location corresponding to a service of a plurality of services.

15. The apparatus of claim 13, wherein a service associated with a service provider of the plurality of service providers is delivery of media content.

16. The apparatus of claim 13, wherein a service associated with a service provider of the plurality of service providers is the collection of data provided by the device.

17. The apparatus of claim 16, wherein the collected data is health monitoring information compiled by the device.

18. The apparatus of claim 16, wherein the collected data is utility usage data compiled by the device.

19. A computer programming product, comprising:
a non-transitory computer-readable storage medium coupled to the processor; and
logic, stored on the computer-readable storage medium for execution on a processor, for:
generating an enhanced management key block (eMKB) comprising a broadcast encryption management key block (MKB) data and information corresponding to a plurality of service providers;
digitally signing the eMKB with a verification signature to produce a digitally signed eMKB operable by a device to verify, using the verification signature, authenticity of each service provider of the plurality of service providers based upon a verification of the digitally-signed eMKB; and
transmitting the digitally signed eMKB, including the verification signature, to the device.

20. The computer programming product of claim 19, wherein the information corresponding to the plurality of service providers identifies an access location corresponding to a service of a plurality of services.

21. The computer programming product of claim 19, wherein a service associated with a service provider of the plurality of service providers is delivery of media content.

22. The computer programming product of claim 19, wherein a service associated with a service provider of the plurality of service providers is the collection of data provided by the device.

23. The computer programming product of claim 22, wherein the collected data is health monitoring information compiled by the device.

24. The computer programming product of claim 22, wherein the collected data is utility usage data compiled by the device.

25. A method, comprising:
generating an enhanced management key block (eMKB) comprising a broadcast encryption management key block (MKB) data and information corresponding to a plurality of service providers;
digitally signing the eMKB with a verification signature to produce a digitally signed eMKB operable by a device to verify, using the verification signature, authenticity of each service provider of the plurality of service providers based, upon a verification of the digitally-signed eMKB; and
transmitting the digitally signed eMKB, including the verification signature, to the device;
wherein the information corresponding to the plurality of service providers identifies an access location corresponding to a service of a plurality of services;
wherein a service associated with a service provider of the plurality of service providers is one of a list consisting of:
delivery of media content; and
collection of data provided by the device; and
wherein the collected data is one of a first consisting of:
health monitoring Information compiled by the device; and
utility usage data compiled by the device.

\* \* \* \* \*